United States Patent
Wang et al.

(10) Patent No.: US 9,363,742 B2
(45) Date of Patent: Jun. 7, 2016

(54) METHOD AND DEVICE FOR SELECTING RADIO ACCESS TECHNOLOGY

(71) Applicant: Telefonaktiebolaget L M Ericsson (publ), Stockholm (SE)

(72) Inventors: Xiaohui Wang, Lund (SE); Satheesh Bikki, Malmo (SE); Conor White, Bjarred (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 12 days.

(21) Appl. No.: 14/370,957

(22) PCT Filed: Jan. 4, 2013

(86) PCT No.: PCT/EP2013/050088
§ 371 (c)(1),
(2) Date: Jul. 7, 2014

(87) PCT Pub. No.: WO2013/104565
PCT Pub. Date: Jul. 18, 2013

(65) Prior Publication Data
US 2015/0005023 A1    Jan. 1, 2015

Related U.S. Application Data (60) Provisional application No. 61/588,285, filed on Jan. 19, 2012.

(30) Foreign Application Priority Data

Jan. 9, 2012 (EP) ..................... 12150467

(51) Int. Cl.
*H04B 7/00* (2006.01)
*H04W 48/18* (2009.01)
(Continued)

(52) U.S. Cl.
CPC .............. *H04W 48/18* (2013.01); *H04W 48/16* (2013.01); *H04W 36/14* (2013.01); *H04W 52/0209* (2013.01); *H04W 88/06* (2013.01)

(58) Field of Classification Search
CPC ..... H04W 88/06; H04W 48/16; H04W 48/18; H04W 36/14
USPC ............ 455/509, 522.1, 69, 68, 553.1, 552.1, 455/550, 434, 435.2, 466, 426.1, 4, 26.2, 455/422.1, 403, 445, 450, 500, 517, 516, 455/515, 513, 508; 370/310, 328, 329, 252, 370/338, 343
See application file for complete search history.

(56) References Cited

U.S. PATENT DOCUMENTS 8,849,272 B2 * 9/2014 Hsu .................. H04W 88/06
370/328
2009/0068969 A1 3/2009 Lindoff et al.
(Continued)

FOREIGN PATENT DOCUMENTS

| EP | 1 482 752 A1 | 12/2004 |
| EP | 2 076 067 A1 | 7/2009 |

(Continued)

OTHER PUBLICATIONS

PCT Written Opinion, mailed Feb. 27, 2013, in connection with International Application No. PCT/EP2013/050088 all pages).
(Continued)

*Primary Examiner* — Keith Ferguson
(74) *Attorney, Agent, or Firm* — Leffler Intellectual Property Law, PLLC (57) ABSTRACT

The present invention relates to a method of a wireless communication terminal for selecting a Radio Access Technology (RAT) to use. The method comprises scanning at least one frequency band to identify available RATs which the terminal can use in view of a configuration of the terminal. The method also comprises measuring at least one predetermined parameter of each of at least two of the available RATs, said parameter being related to the end-to-end performance available to the terminal via each of the at least two RATs. The method further comprises establishing which one of the available RATs provides the best performance, based on the measurements of the predetermined parameter. The invention also relates to a wireless communication terminal and to a computer program product.

11 Claims, 4 Drawing Sheets

(51) Int. Cl.
*H04W 48/16* (2009.01)
*H04W 36/14* (2009.01)
*H04W 88/06* (2009.01)
*H04W 52/02* (2009.01)

(56) References Cited

U.S. PATENT DOCUMENTS

| | | | |
|---|---|---|---|
| 2009/0104907 A1* | 4/2009 | Otting | H04W 48/10 455/435.3 |
| 2009/0325572 A1 | 12/2009 | Ji | |
| 2010/0009676 A1* | 1/2010 | Cormier | H04L 42/52 455/426.1 |
| 2010/0075665 A1 | 3/2010 | Nader et al. | |
| 2010/0099393 A1* | 4/2010 | Brisebois | H04M 15/28 455/418 |
| 2013/0023274 A1* | 1/2013 | Meredith | H04W 48/18 455/450 |

FOREIGN PATENT DOCUMENTS

| | | |
|---|---|---|
| GB | 2 403 870 A | 1/2005 |
| WO | 0203733 A1 | 1/2002 |
| WO | 2007/133526 A2 | 11/2007 |
| WO | 2011/088612 A1 | 7/2011 |

OTHER PUBLICATIONS

PCT International Search Report, mailed Feb. 27, 2013, in connection with International Application No. PCT/EP2013/050088 (all pages).

\* cited by examiner

METHOD AND DEVICE FOR SELECTING RADIO ACCESS TECHNOLOGY

TECHNICAL FIELD

The invention relates to a method of a wireless communication terminal for selecting a Radio Access Technology, as well as to a wireless communication terminal.

BACKGROUND

Power consumption in mobile phones has been a main issue for the telecommunication industry, especially with the ever increasing number and complexity of applications in smartphones. A lot of effort has been spent to reduce the power consumption of the mobile phones, e.g. via fast dormancy and other power saving modes.

Another way of reducing power consumption is for the mobile phone to actively select the most suitable Radio Access Technology (RAT) for a given operating mode, such as voice call, internet surfing etc., in order to not use more power than necessary. Selection of RAT for this purpose is disclosed in US 2009/0068969 and US 2010/0075665, both to Telefonaktiebolaget LM Ericsson.

RAT selection in accordance with the referenced patent applications may be highly beneficial for reducing unnecessary power consumption in mobile radio devices. However, power saving is not always an important issue. It may be desirable for mobile radio devices to stay connected rather than to save power, in order to reduce latency, and/or to optimise the available bandwidth.

SUMMARY

It is an objective of the present invention to at least alleviate a problem with the prior art.

According to an aspect of the present invention, there is provided a method of a wireless communication terminal for selecting a Radio Access Technology (RAT) to use. The method comprises scanning at least one frequency band to identify available RATs which the terminal can use in view of a configuration of the terminal. The method also comprises measuring at least one predetermined parameter of each of at least two of the available RATs, said parameter being related to the end-to-end performance available to the terminal via each of the at least two RATs. The method further comprises establishing which one of the available RATs provides the best performance, based on the measurements of the predetermined parameter.

According to another aspect of the present invention, there is provided a wireless communication terminal. The terminal comprises means for scanning at least one frequency band to identify available RATs which the terminal can use in view of a configuration of the terminal. The terminal also comprises means for measuring at least one predetermined parameter of each of at least two of the available RATs, said parameter being related to the end-to-end performance available to the terminal via each of the RATs. The terminal further comprises means for establishing which one of the available RATs provides the best performance, based on the measurements of the predetermined parameter.

According to another aspect of the present invention, there is provided a wireless communication terminal. The terminal comprises a scanner configured for scanning at least one frequency band to identify available RATs which the terminal can use in view of a configuration of the terminal. The terminal also comprises circuitry for measuring at least one predetermined parameter of each of at least two of the available RATs, said parameter being related to the end-to-end performance available to the terminal via each of the RATs. Said circuitry for measuring may e.g. be comprised in a receiver and/or a processing unit of the terminal. The terminal further comprises a processing unit configured for establishing which one of the available RATs provides the best performance, based on the measurements of the predetermined parameter.

Any of the communication terminal aspects above may be used for performing the method aspect of the present invention.

According to another aspect of the present invention, there is provided a computer program for a wireless communication terminal to select a Radio Access Technology (RAT) to use. The computer program comprises computer program code which, when run on a the terminal, causes said terminal to scan at least one frequency band to identify available RATs which the terminal can use in view of a configuration of the terminal. The computer program code also causes the terminal to measure at least one predetermined parameter of each of at least two of the available RATs, said parameter being related to the end-to-end performance available to the terminal via each of the at least two RATs. The computer program code further causes the terminal to establish which one of the available RATs provides the best performance, based on the measurements of the predetermined parameter.

The computer program aspect of the present invention may be run on a wireless communication terminal according to any of the communication terminal aspects above of the present invention.

According to another aspect of the present invention, there is provided a computer program product comprising a computer program of the computer program aspect above and a computer readable means on which the computer program is stored.

According to another aspect of the present invention, there is provided a computer program product comprising computer-executable components for causing a wireless communication terminal to perform the method of the method aspect above when the computer-executable components are run on a processing unit included in the terminal.

It is an advantage of the present invention of any of the aspects above that Radio Access Technology (RAT) may be selected for use of a wireless communication terminal, e.g. for connecting to a network node, based on performance, e.g. rather than on power consumption. The performance of the terminal may thus be improved when the available power is not an issue, e.g. if the battery is sufficiently charged or the terminal is connected to a (non-chargeable) power source. As an example it can be mentioned that there is a new trend in the IP centric world, which is to use wireless tablet computers, e.g. iPad, instead of stationary PCs or laptops and to install mobile broadband enabled routers. It's no doubt easier to move around with a tablet computer. However, as a consequence, the availability and use of always connected fixed-line internet connection with PC/laptop with low latency and almost unlimited bandwidth is diminishing. The possibility to improve/optimise performance of a wireless communication terminal, such as a tablet/portable computer may thus be advantageous.

The discussions above and below in respect of any of the aspects of the invention is also in applicable parts relevant to any other aspect of the present invention.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

The invention will now be described more fully hereinafter, and also with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The wireless communication terminal may be any suitable communication terminal configured for communication over a radio interface, such as a mobile phone or a portable computer or the like.

The term "RAT" is intended to be broadly interpreted to include any type of wireless access technology. For example, the wireless access technology may be General Packet Radio Service (GPRS), Wideband Code Division Multiple Access (WCDMA), Long Term Evolution (LTE), Global System for Mobile Communication (GSM), a microwave access technology (e.g., Bluetooth, Worldwide Interoperability for Microwave Access (WiMAX), Institute of Electrical and Electronic Engineering (IEEE) 802.X, etc.), and/or a satellite access technology (e.g., two-way broadband satellite multimedia access, such as Time Division Multiple Access (TDMA), Frequency Division Multiple Access (FDMA), Digital Video Broadcasting-Return Channel via Satellite (DVB-RCS), etc.).

A RAT selection mode is herein a mode activating a set of rules or the like for how the terminal should select one of a plurality of available RATs. The selected RAT may then be used by the communication terminal for communicating with a network, e.g. via a Radio Base Station (RBS), e.g. for access to the Internet. The RBS may e.g. be a Node B or eNode B, or any other network node able to communicate with the communication terminal over a wireless interface.

A RAT can be considered to be available to a terminal when it can be used for communication by the terminal in view of the configuration of the terminal. The configuration may govern the resources needed by the terminal to be provided via the RAT for the RAT to be regarded as available to the terminal in view of its configuration.

The terminal may be configured e.g. with regard to which RATs the terminal at all supports and/or with regard to the application(s) currently run on the terminal, e.g. voice communication, internet surfing, short message service etc.

The end-to-end performance available to a terminal via a RAT is intended to relate to the performance, not only for a part of a transmission via the RAT such as over the air interface, but the whole way from the origin of the transmission in a layer in the terminal to the terminating/target of the transmission e.g. in a layer of a network node, including the way via different layers of the terminal, the air interface and different layers of the terminating/target network node as well as any other nodes there between e.g. an RBS, and/or a way in the opposite direction. In this way, a more complete measurement of performance of a RAT may be obtained than if e.g. only the throughput over the air interface is measured. The measured parameter related to the end-to-end performance may e.g. be, or be related to, end-to-end throughput/packet loss and/or latency, which are important parameters for different terminal applications. Thus, the measuring of the predetermined parameter may give an indication of available overall throughput of data bits from/to the terminal via each of the at least two RATs and/or an indication of latency of data bits from/to the terminal via each of the at least two RATs. The throughput and/or latency parameter(s) may be measured from an originating IP address of data bits to a terminating IP address of said data bits.

The inventive method may comprise ascertaining a minimum requirement of at least one predetermined parameter of a RAT for allowing said RAT to be selected, based on the configuration of the terminal. Thus, for a RAT to be eligible for selection (and thus possibly also to be at all available), the RAT may need to fulfil a minimum requirement regarding the predetermined parameter. This minimum requirement is ascertained in view of the configuration of the terminal. The ascertaining may be performed prior to the scanning to identify available RATs, or after the scanning but before the establishing or selecting of a RAT. The ascertaining may identify the requirement or need of the terminal in respect of said parameter, in view of the configuration of the terminal. Examples of parameters may e.g. include bandwidth in different parts of the communication transmissions, end-to-end throughput of transmitted bits, latency etc., or parameter(s) related to radio reception by the terminal e.g. Reference Signal Received Power (RSRP) or Reference Signal Received Quality (RSRQ). For example, a terminal currently mediating a voice communication may require low latency, and a terminal streaming video over Internet may require high bandwidths and throughput. A minimum requirement may be ascertained for more than one parameter, whereby the requirements may be hierarchically ordered such that one requirement takes precedence over another requirement if no RAT is found which satisfies all requirements.

The inventive method may comprise measuring at least one predetermined parameter of at least two of the available RATs. By means of said measuring, a RAT may be selected among the at least two RATs based on the thus obtained property/value of the measured parameter. Examples of parameters may e.g. include bandwidth in different parts of the communication transmissions, end-to-end throughput of transmitted bits, latency etc. Also other parameter(s) than the at least one parameter related to performance may be measured for the available RATs, such as parameters related to radio reception by the terminal e.g. Reference Signal Received Power (RSRP) or Reference Signal Received Quality (RSRQ). If a minimum requirement of a parameter has been ascertained as discussed above, the same parameter may be measured. Thus, the measurements may be compared to the minimum requirement, whereby the terminal may decide that one or several of the RATs has unsatisfactory properties and should be disqualified from being selected if the parameter of the RAT is measured to a value which does not satisfy the minimum requirement.

The inventive method may comprise using the established RAT for connecting to a node via the established RAT. The RAT that has been established to give the best performance may thus be selected for use by the terminal, and subsequently used, for connecting to a network communication node of a network via said established RAT, e.g. for sending or receiving communication messages to the network node.

The establishing/selecting a RAT for use by a terminal based on end-to-end performance as discussed herein may be regarded as a performance mode for RAT selection. In the performance mode the selected RAT should be selected based on which of the available RATs presents a higher end-to-end service quality, with regard to e.g. overall throughput and/or latency. The performance mode may thus activate rule(s) for selecting a RAT among a plurality of available RATs based on which RAT offers the highest end-to-end service quality. The service quality may be considered in view of the configuration of the terminal, e.g. on which application(s) is running on the terminal, as discussed above. The performance mode may comprise measurement of an end-to-end service quality of the entire network, the network comprising the terminal, the target node and any intermediate nodes e.g. RBS. A parameter such as throughput and/or latency may be measured for each of the available RATs, and the RAT with the best value (in respect of high performance) of the parameter is selected.

As an exemplary implementation of the performance mode, the terminal may ping a pre-determined server via each of the available (and not disqualified) RATs for the available frequencies to get latency and/or throughput and/or packet loss values. For an idle terminal, this may be done regularly. For an active terminal, this can be done during a connection gap or through non-active RATs. The results may be analysed, and the RAT with the best performance, e.g. the one with the shortest latency and highest throughput, may be selected. If this cannot be satisfied, the terminal may check any pre-set applications preferred by the user, or the most recently used application or statistics of the used applications, to set requirements of maximal latency and/or minimal throughput. All RATs with longer latency may then be disqualified from being selected. The RAT, which has not been disqualified, with the highest throughput may then be selected as the current RAT. Other available RATs may form a list for the next RAT selection, ordered by their throughput values. If none of the RATs fulfil the latency requirement, they may be ordered in terms of their latency for new measurements and selections. Similarly, alternatively or additionally, all RATs with lower throughput than the minimal throughput may then be disqualified from being selected, and the RAT, which has not been disqualified, with the shortest latency may be selected as the current RAT, etc.

The inventive method may comprise providing a plurality of different predetermined RAT selection modes, said plurality of RAT selection modes comprising a performance mode, e.g. as discussed above. The inventive method may also comprise determining in which one of the plurality of different predetermined RAT selection modes the terminal currently is in. The method may then comprise selecting which one of the available RATs to use, based on the determined RAT selection mode, wherein the established RAT is selected if the terminal has been determined to be in the performance mode.

It is an advantage of providing the plurality of different predetermined RAT selection modes that different RAT selection modes may be determined and used by the terminal, making the wireless communication terminal more flexible and adaptable regarding which of a plurality of available RATs to select. Different RAT selection modes may e.g. be more desirable in different circumstances. For example, under certain circumstances in which the terminal is, it may be desirable to select RAT based on certain parameter(s), whereas, under other circumstances, it may be desirable to select RAT based on other parameter(s).

The performance mode may e.g. be beneficial if the availability of electrical power is not limited or at least not of immediate concern, e.g. if the terminal is connected to a power source, e.g. a power source other than a battery integrated in the wireless terminal, e.g. a non-chargeable power source, e.g. an external power source, e.g. if the terminal is connected to an electrical power grid via an electrically conducting cord.

The plurality of different predetermined RAT selection modes may comprise a radio reception mode, in which the selected RAT should be selected based on which of the available RATs presents a higher downlink reception, as measured e.g. as Reference Signal Received Power, RSRP, or Reference Signal Received Quality, RSRQ. The radio reception mode may thus activate rule(s) for selecting a RAT among a plurality of available RATs based on downlink reception. Thus, the RAT with which the terminal receives transmissions with the highest quality and/or strength from a base station may be selected.

The plurality of different predetermined RAT selection modes may comprise a power saving mode, in which the selected RAT should be selected based on which of the available RATs implies a lower power consumption in the terminal. The radio reception mode may thus activate rule(s) for selecting a RAT among a plurality of available RATs based on power consumption per time unit and/or battery time in the terminal. A RAT may incur a higher power consumption, and thus shorter battery time, in the terminal, than another RAT. For example, using a 3G RAT may consume more power per time unit in a mobile phone than using a GSM RAT. The GSM RAT may still be available to the terminal (and may not have been disqualified due to not satisfying a minimum requirement (if included in the method), as discussed above) given its configuration, even though applications may run slower than if the 3G RAT is used. According to the power saving mode, the GSM RAT may thus be selected.

The determining may be dependent on noting a user profile of the terminal, the user profile having been chosen by a user of the terminal. The user profile may e.g. have been chosen by the user inputting a command into the terminal, e.g. via an input unit of the terminal such as a keypad or touch screen. The user may e.g. in a menu choose a performance mode if high performance is the main issue, or a power saving mode if the user fears that the battery may run out.

Additionally or alternatively, the determining is dependent on observing at least one predetermined metric, the metric(s) being a geographical position of the terminal, a time of day and/or of week, and/or a battery charge level of the terminal. For instance, it may be desired to prioritise high performance when at the office, where a power supply may be readily available, making power saving less of an issue. In this case the metric may be a geographical position of the terminal whereby the terminal determines that it is in the performance mode if the metric value, e.g. by means of a positioning unit in the terminal, is consistent with the terminal being at the office. Additionally or alternatively, the metric may be a time metric, whereby the terminal determines that it is in the performance mode if the metric value is consistent with regular office hours. If the battery charge is low, the terminal may automatically switch to a power saving mode.

The embodiments of the present invention discussed, as well as other embodiments, above will now be further discussed with reference to the appended figures.

Figure 1:
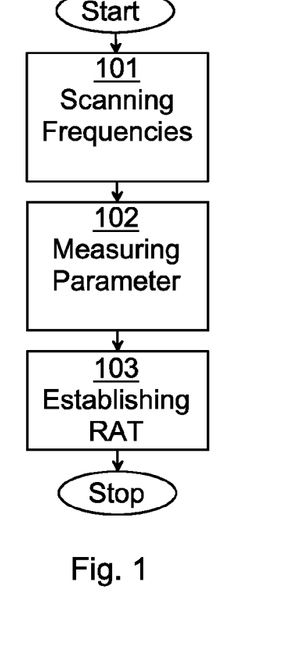
FIG. 1 is a schematic flow chart of an embodiment of a method of the present invention.

FIG. 1 is a schematic flow chart of an embodiment of a method of the present invention. In step 101, the terminal is scanning 101 at least one electro magnetic wave frequency band to identify available RATs which the terminal can use in view of a configuration of the terminal. By this, the terminal may identify and be made aware of which RATs that are covering the geographical position of the terminal. In step 102, the terminal is measuring 102 at least one predetermined parameter of each of at least two of the available RATs. In accordance with the discussion above, said parameter is related to the end-to-end performance available to the terminal via each of the at least two RATs. In step 103, the terminal is establishing 103 which one of the available RATs provides the best performance, based on the measurements 102 of the predetermined parameter. This established 103 RAT may, in accordance with the discussion above, be selected to be used by the terminal for connecting the terminal to a network via said RAT. Alternatively, e.g. if a plurality of RAT selection modes are provided, as discussed above, the established 103 RAT may only be used if the terminal has been determined to be in a performance mode.

Figure 2:
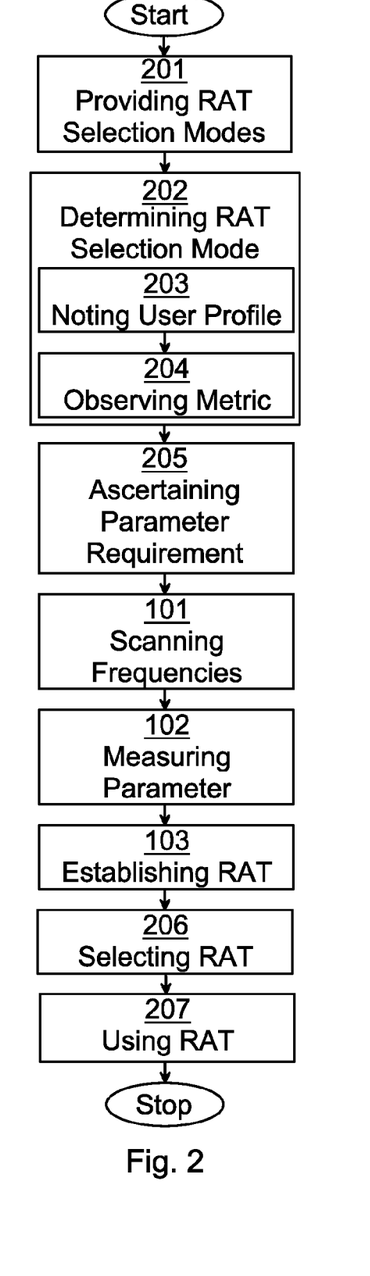
FIG. 2 is a schematic flow chart of another embodiment of a method of the present invention.

FIG. 2 is a schematic flow chart of another embodiment of a method of the present invention. With reference to this figure a more specific embodiment is discussed. Many of the method steps are optional within the present invention and the steps need not be performed in the shown order. In step 201, a plurality of RAT selection modes may be provided. The modes may e.g. have been programmed into the terminal upon manufacture, or they may have been defined and inputted by a user or a network node associated with the terminal. In step 202, the terminal may determine in which RAT selection mode it is, e.g. the terminal may use some sort of rules governing under which circumstances which mode should be active at the current time. The mode may e.g. have been chosen by a user of the terminal, e.g. by choosing the mode in a menu of the terminal. As discussed above, the determining 202 may comprising noting 203 an active user profile, which user profile governs when which of the modes is active. Additionally or alternatively, the determining 202 may comprise observing 204 a metric, as discussed above. The metric may e.g. be a geographical position of the terminal, a time of day and/or of week, and/or a battery charge level of the terminal, as discussed above. If a user profile is active and noted 203, the user profile may e.g. state that the terminal should use a performance mode if the terminal is at the office, whereby the metric may be observed 204 to determine whether the terminal is, or is likely to be, at the office. In step 205, the terminal may ascertain 205 a minimum requirement of at least one predetermined parameter of a RAT for allowing said RAT to be selected, as discussed above. The ascertaining 205 may be based on the configuration of the terminal. In this step of ascertaining 205, the terminal may make an internal survey to find out what resources the terminal needs from a RAT. No measurements are made on any RAT at this ascertaining 205, the terminal may merely ascertain 205 its own requirements. Steps 101, 102 and 103 may be as discussed with reference to FIG. 1. In step 206, the terminal may be selecting 206 which one of the available RATs to use 207 for connecting via, as discussed above. The selecting 206 may be based on the determined 202 RAT selection mode. The established 103 RAT may be selected 206 if the terminal has been determined 202 to be in the performance mode. If another mode than the performance mode has been determined 202, another RAT than the established 103 RAT may be selected 206, depending on the rules related to the determined 202 mode. In step 207, the selected 206 RAT may be used 207 by the communication terminal for connecting to e.g. a network node via said selected 206 RAT, as discussed above. As mentioned above, the steps need not be performed in the order depicted in FIG. 2, the steps 101-103 relating to the performance mode, may e.g. be performed before or in parallel to the steps 201-202 relating to choosing a RAT selection mode.

Figure 3:
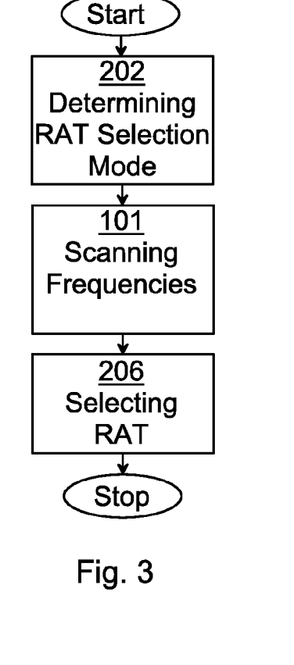
FIG. 3 is a schematic flow chart of another embodiment of a method of the present invention.

FIG. 3 is a schematic flow chart of another embodiment of a method of the present invention. The embodiment of FIG. 3 is not limited to the inclusion of a performance mode. Rather, the embodiment only relates to selecting 206 a RAT based on the determining 202 of a RAT selection mode. In step 202, a RAT selection mode is determined 202 as discussed in relation to FIG. 2. One of the modes that are available for being determined 202 may be a performance mode as discussed above, but it is also contemplated that such a performance mode may not be available for determining 202. Modes which may be determined 202 may e.g. include any of the performance mode, power saving mode and radio reception mode discussed above. In step 101, the terminal scans electro magnetic wave frequencies as discussed above. In step 206, one of the available RATs is selected 206 for use as governed by the rules relating to the determined 202 RAT selection mode, as discussed with reference to FIG. 2.

Figure 4:
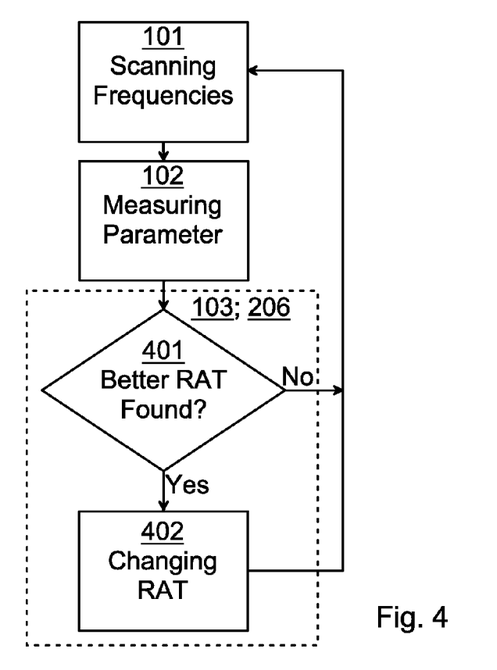
FIG. 4 is a schematic flow chart of another embodiment of a method of the present invention.

FIG. 4 is a schematic flow chart of another embodiment of a method of the present invention. This embodiment is similar to the embodiment discussed in FIG. 1. However, FIG. 4 illustrates that method steps 101, 102 and 103, as discussed with reference to FIG. 1, are performed periodically, possibly automatically after a specified time period has expired since the last time the method was performed. Thus, frequencies are scanned 101 for RATs available to the terminal, a performance parameter is measured 102 on each of the available RATs and the RAT with the best performance is established 103. Since the terminal is in the performance mode, the establishing 103 of the RAT also implies that said RAT is selected 206 for use 207 if other RAT selection modes also exist, cf. FIG. 2. As part of the establishing 103, the results of the measurement 102 are analysed to see if a RAT with a better performance than the RAT through which the terminal is currently connected is available. If not, the terminal continues to be connected via the current RAT and a new cycle of the method steps 101-103 will ensue in due time. If a better RAT is found, e.g. decreased latency or increased throughput, the terminal changes 402 RAT such that connects via the new better RAT instead. A new cycle of the method steps 101-103 will then ensue in due time in order to try to find an even better RAT.

Figure 5:
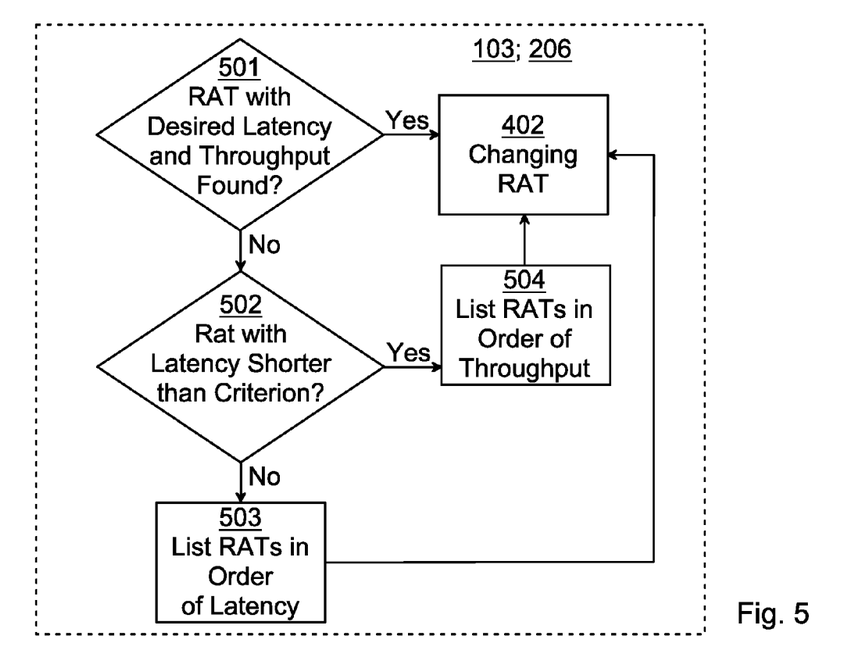
FIG. 5 is a schematic flow chart of an embodiment of establishing which RAT provides the best performance in a method of the present invention.

FIG. 5 is a schematic flow chart of illustrating in more detail how the RAT with the best performance may be established 103, and thus also selected 206, based on the measuring 102. First it may be determined whether a RAT with desired/needed, depending on the terminal configuration, throughput and latency has been found 501 at the measuring 102. For instance, based on the requirements/configuration of the terminal, a minimum limit for the throughput and a maximum limit for the latency may be set, and for a RAT to have desired latency and throughput a RAT has to provide a latency below the maximum limit of the latency and above the minimum limit for the throughput. If more than one such desired RAT is found, the RAT providing the highest throughput and/or lowest latency may be established 103 and the terminal changes 402 to that RAT if it is not already connected via said RAT. If no RAT providing the desired latency and throughput has been found 501, the terminal may check, in step 502, whether a RAT providing a latency shorter than a second maximum limit has been found. This second maximum latency limit may have been set such that the terminal may still support its applications sufficiently, if not as desired. Any RATs providing a latency below the second maximum latency limit may then be listed in order of throughput 504 and the RAT among these sufficient RATs which provides the highest throughput is established 103 and changed 402 to. If no RAT having a latency below the second maximum latency limit is available, the available RATs are listed 503 in order of the latency they provide and the RAT providing the shortest latency is established 103 and changed 402 to. According to this embodiment, the RAT may be regarded as established 103 primarily based on latency, but it is also envisioned that the RAT may be established 103 primarily based on throughput. Thus, in step 502, the available RATs may instead be tested against a second minimum throughput limit, why any RATs providing a throughput above that second minimum throughput limit may be listed in order of their latencies whereby the RAT having the lowest latency is established 103, and if no RAT providing a throughput above that second minimum throughput limit is available, the RATs are listed in order of throughput whereby the RAT having the highest throughput may be established 103.

Figure 6:
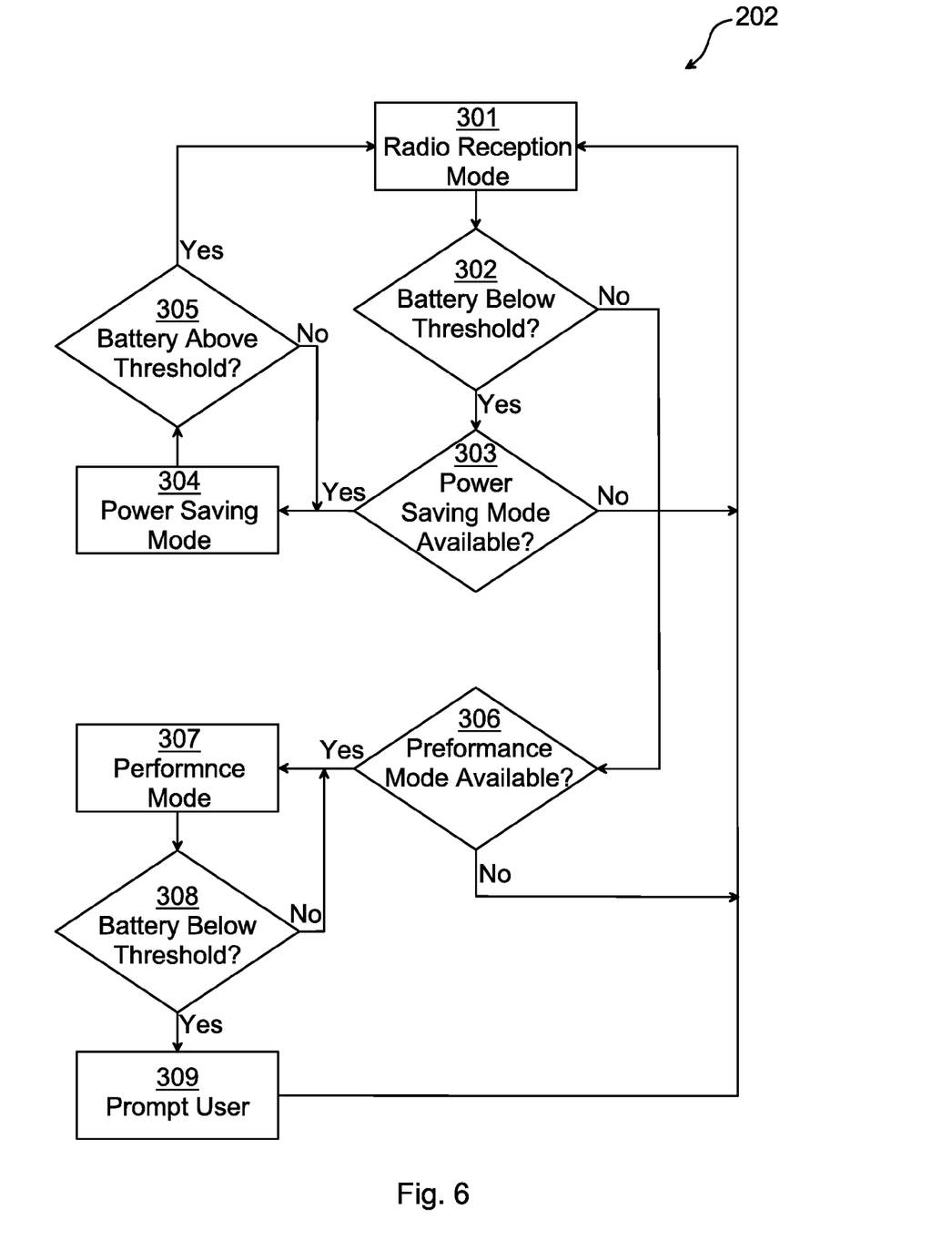
FIG. 6 is a schematic flow chart of an embodiment of determining a RAT selection mode in a method of the present invention.

FIG. 6 is a schematic flow chart of an embodiment of how to determine 202 in which RAT selection mode the terminal is in. This determining 202, regardless of in which mode 301, 304 or 307 the terminal is currently, may be performed periodically, possibly automatically after a specified time period has expired since the last time the method was performed. According to this embodiment, the terminal may have three different RAT selection modes, a performance mode 307, a power saving mode 304 and a radio reception mode 301. These modes may be as discussed above. The radio reception mode 301 might only be used if none of the other modes 304 and 307 are available and/or intermediately when switching between the other modes. If the terminal is currently in the radio reception mode 301, the terminal checks, in step 302, whether the battery charge level is above or below a pre-set threshold. If the battery is above the threshold, the terminal does not regard power to be an issue, why the performance mode 307 should preferably be used. The terminal thus, in step 306, checks whether the performance mode 307 is available, if so, the terminal switches mode to the performance mode 307, if not, the terminal remains in the radio reception mode 301. If the battery is below the threshold in step 302, the terminal instead regards power to be an issue, why the power saving mode 304 should be used. Thus the terminal, in step 303, checks whether the power saving mode 304 is available. If the power saving mode 304 is available, the terminal switches mode to the power saving mode 304. If not, the terminal remains in the radio reception mode 301. If the terminal is currently in the power saving mode 304, the terminal periodically checks, in step 305, whether the battery charge level is above a threshold, possibly the same threshold as in step 302. If the battery is above the threshold, e.g. if the terminal battery has been at least partly re-charged, the terminal switches to the radio reception mode. If not, the terminal stays in the power saving mode 304. Similarly, if the terminal is currently in the performance mode 307, the terminal periodically checks, in step 308, whether the battery charge level is below a threshold, possibly the same as the threshold in step 302 and/or 305. If the battery is above the threshold, the terminal remains in the performance mode 307, but if the terminal is below the threshold, the terminal may prompt 309 the user to e.g. charge the battery. If the battery level remains low, e.g. if the battery charge level goes below a second threshold, the mode is switched to the radio reception mode 301.

Figure 7:
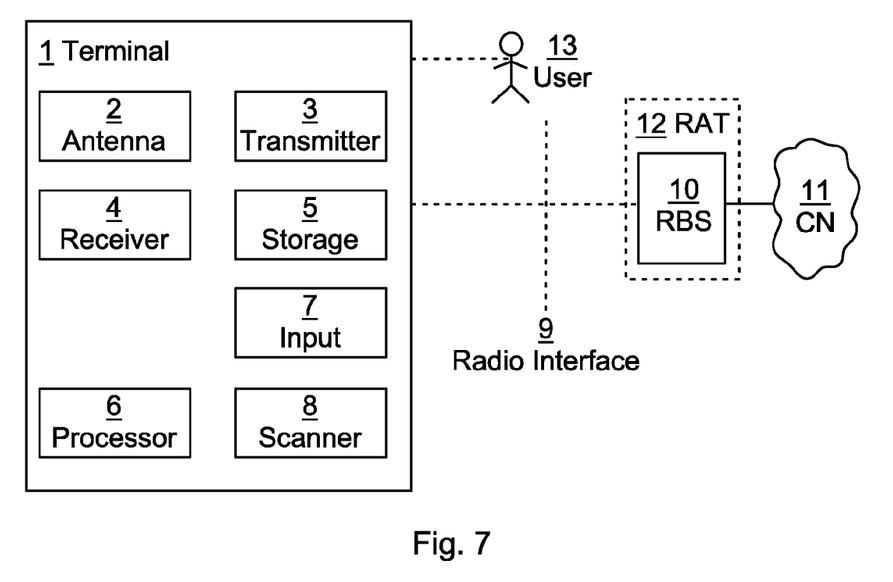
FIG. 7 is a schematic diagram illustrating an embodiment of a wireless communication terminal of the present invention.

FIG. 7 is a schematic illustration of a communication network comprising an embodiment of a wireless communication terminal 1 of the present invention. The communication terminal is connected to a core network 11 node via a RAT 12. The RAT 12 may be any RAT as discussed above. The RAT 12 comprises, according to this embodiment, a radio base station 10 which is connected to the terminal 1 over a radio interface 9. A user 13, such as a human, uses the terminal 1. The terminal 1 may comprise a radio receiver 4 and a radio transmitter 3 as well as an antenna 2 associated to the receiver 4 and the transmitter 3. The receiver 4 may e.g. be involved in the measuring 102 the at least one predetermined parameter of each of at least two of the available RATs (12), as discussed above. The terminal may further comprise a scanning module 8, which may be associated with or integrated in the receiver 4. The scanning module 8 may e.g. used for scanning 101 frequencies as discussed above and may thus be a means for scanning 101 at least one frequency band to identify available RATs 12 which the terminal 1 can use in view of a configuration of the terminal 1. The terminal 1 may further comprise a processing unit 6. The processing unit 6 may have several different functions. The processing unit 6 may e.g. be involved in the measuring 102 of at least one predetermined parameter of each of at least two of the available RATs 12, possibly in cooperation with the receiver 4. The processing unit 6 may e.g. be involved in the establishing 103 of which one of the available RATs 12 provides the best performance, based on the measurements 102 of the predetermined parameter. The processing unit 6 may e.g. be involved in the determining 202 of in which one of the plurality of different predetermined RAT selection modes 301,304,307 the terminal 1 currently is in. The processing unit 6 may e.g. be involved in the selecting 206 of which one of the available RATs 12 to use 207, based on the determined 202 RAT selection mode 301, 304,307, wherein the established 103 RAT 12 is selected 206 if the terminal 1 has been determined 202 to be in the performance mode 307. The terminal may comprise a storage unit 5 which may be associated to the processing unit 6. The storage unit may e.g. hold the plurality of pre-programmed different RAT selection modes 301,304, 307 and may thus be a means for providing 201 a plurality of different predetermined RAT selection modes 301,304,307, said plurality of RAT selection modes comprising a performance mode 307. The terminal 1 may comprise an input unit 7, such as a keypad of touch screen, by means of which a user 13 of the terminal may input commands into the terminal 1. The user 13 may e.g. by mans of the input unit 7 choose a user profile which governs which RAT selection mode is used and thus determined 202 by the terminal 1.

Figure 8:
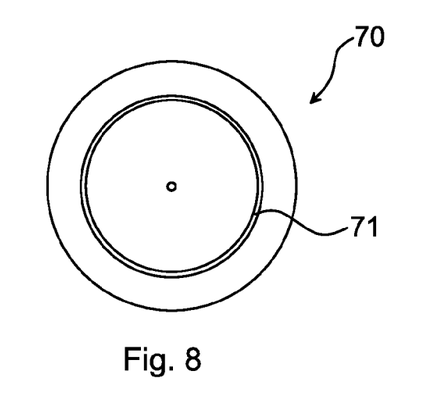
FIG. 8 is a schematic diagram illustrating an embodiment of a computer program product of the present invention.

FIG. 8 illustrates a computer program product 70 or a computer readable medium 70 comprising a computer program 71 or computer-executable components 71. The computer program/computer-executable components 71 may be configured to cause a wireless communication terminal 1, e.g. as discussed above, to perform an embodiment of the method of the present invention. The computer program/computer-executable components 71 may be run on the processing unit 6 of the terminal 1 for causing the device to perform the method. The computer program product/computer readable medium 70 may e.g. be comprised in a storage unit or memory comprised in the terminal 1 and associated with the processing unit 6. Alternatively, the computer program product/computer readable medium 70 may be, or be part of a separate, e.g. mobile, storage means, such as a computer readable disc, e.g. CD or DVD or hard disc/drive, or a solid state storage medium, e.g. a RAM or Flash memory.

Below follow a number of other contemplated aspects and embodiments of the present invention.

According to an aspect of the present invention, there is provided a method of a wireless communication terminal. The method is for selecting a Radio Access Technology (RAT) to use. The method comprises providing a plurality of different predetermined RAT selection modes. The method also comprises determining in which one of the plurality of different predetermined RAT selection modes the terminal currently is in. The method further comprises scanning at least one frequency band to identify available RATs which the terminal can use in view of a configuration of the terminal. The method also comprises selecting which one of the available RATs to use, based on the determined RAT selection mode.

According to another aspect of the present invention, there is provided a wireless communication terminal. The terminal comprises means for providing a plurality of different predetermined RAT selection modes. The terminal also comprises means for determining in which one of the plurality of different predetermined RAT selection modes the terminal currently is in. The terminal further comprises means for scanning at least one frequency band to identify available RATs which the terminal can use in view of the configuration of the terminal. The terminal also comprises means for selecting which one of the available RATs to use, based on the determined RAT selection mode.

According to another aspect of the present invention, there is provided a wireless communication terminal. The terminal comprises a storage unit configured for storing a plurality of different predetermined RAT selection modes. The terminal also comprises a scanning unit configured for scanning at least one frequency band to identify available RATs which the terminal can use in view of the configuration of the terminal. The terminal further comprises a processing unit configured for determining in which one of the plurality of different predetermined RAT selection modes the terminal currently is in. The processing unit is also configured for selecting which one of the available RATs to use, based on the determined RAT selection mode.

Any of the communication terminal aspects above may be used for performing the method aspect of the present invention.

According to another aspect of the present invention, there is provided a computer program for a wireless communication terminal to select a Radio Access Technology (RAT) to use. The computer program comprises computer program code which, when run on a terminal, causes said terminal to determining in which one of a plurality of different predetermined RAT selection modes stored in the terminal said terminal currently is in. The computer program code also causes the terminal to scan at least one frequency band to identify available RATs which the terminal can use in view of a configuration of said terminal. The computer program code further causes the terminal to select which one of the available RATs to use, based on the determined RAT selection mode.

The computer program aspect of the present invention may be run on a wireless communication terminal according to any of the communication terminal aspects above of the present invention.

According to another aspect of the present invention, there is provided a computer program product comprising a computer program of the computer program aspect above and a computer readable means on which the computer program is stored.

According to another aspect of the present invention, there is provided a computer program product comprising computer-executable components for causing a wireless communication terminal to perform the method of the method aspect above when the computer-executable components are run on a processing unit included in the terminal.

It is an advantage of the present invention of any of the contemplated aspects above that different RAT selection modes may be determined and used by the terminal, making the wireless communication terminal more flexible and adaptable regarding which of a plurality of available RATs to select. Different RAT selection modes may e.g. be more desirable in different circumstances. For example, under certain circumstances in which the terminal is, it may be desirable to select RAT based on certain parameter(s), whereas, under other circumstances, it may be desirable to select RAT based on other parameter(s).

Embodiment 1

A method of a wireless communication terminal 1 for selecting a RAT 12 to use, the method comprising:
providing 201 a plurality of different predetermined RAT selection modes 301,304,307;
determining 202 in which one of the plurality of different predetermined RAT selection modes 301,304,307 the terminal 1 currently is in;
scanning 101 at least one frequency band to identify available RATs 12 which the terminal 1 can use in view of a configuration of the terminal; and
selecting 206 which one of the available RATs 12 to use, based on the determined 202 RAT selection mode.

Embodiment 2

The method of Embodiment 1, further comprising ascertaining 205 a minimum requirement of at least one predetermined parameter of a RAT 12 for allowing said RAT 12 to be selected 206, based on the configuration of the terminal 1.

Embodiment 3

The method of Embodiment 1 or 2, further comprising measuring 102 at least one predetermined parameter of at least two of the available RATs 12.

Embodiment 4

The method of any Embodiment 1-3, wherein the plurality of different predetermined RAT selection modes comprises:

a radio reception mode 301, in which the selected RAT 12 should be selected 206 based on which of the available RATs 12 presents a higher downlink reception, as measured 102 e.g. as Reference Signal Received Power (RSRP) or Reference Signal Received Quality (RSRQ);

a power saving mode 304, in which the selected RAT 12 should be selected 206 based on which of the available RATs 12 implies a lower power consumption in the terminal 1; and a performance mode 307, in which the selected RAT 12 should be selected 206 based on which of the available RATs 12 presents a higher end-to-end service quality, with regard to e.g. overall throughput and/or latency.

Embodiment 5

The method of Embodiment 4, wherein the performance mode 307 is selected 206 if the terminal 1 is connected to a power supply.

Embodiment 6

The method of any Embodiment 1-5, wherein the determining 202 is dependent on noting 203 a user profile of the terminal 1, the user profile having been chosen by a user 13 of the terminal 1.

Embodiment 7

The method of any Embodiment 1-6, wherein the determining 202 is dependent on observing 204 at least one predetermined metric, e.g. geographical position of the terminal 1, time of day and/or of week, and/or battery charge level of the terminal 1.

Embodiment 8

A wireless communication terminal 1 comprising:
means 5 for providing a plurality of different predetermined RAT selection modes 301,304,307;
means 6 for determining 202 in which one of the plurality of different predetermined RAT selection modes 301,304,307 the terminal 1 currently is in;
means 8 for scanning 101 at least one frequency band to identify available RATs which the terminal 1 can use in view of the configuration of the terminal;
means 6 for selecting 206 which one of the available RATs to use, based on the determined 202 RAT selection mode.

Embodiment 9

A computer program product 70 comprising computer-executable components 71 for causing a wireless communication terminal 1 to perform the method of any one of Embodiments 1-7 when the computer-executable components 71 are run on a processing unit 6 included in the terminal 1.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a wireless communication terminal for selecting a Radio Access Technology (RAT) to use, the method comprising:

scanning at least one frequency band to identify available RATs which the terminal can use in view of a configuration of the terminal;

measuring at least one predetermined parameter of each of at least two of the available RATs, said parameter being related to the end-to-end performance available to the terminal via each of the at least two RATs;

establishing which one of the available RATs provides the best performance, based on the measurements of the predetermined parameter;

providing a plurality of different predetermined RAT selection modes, said plurality of RAT selection modes comprising a performance mode;

determining which one of the plurality of different predetermined RAT selection modes the terminal currently is in; and selecting which one of the available RATs to use, based on the determined RAT selection mode, wherein the established RAT is selected if the terminal has been determined to be in the performance mode, wherein the measuring of the predetermined parameter gives an indication of available overall throughput of data bits from/to the terminal via each of the at least two RATs and/or an indication of latency of data bits from/to the terminal via each of the at least two RATs, and wherein the throughput and/or latency parameter(s) is measured between an origin of a transmission in a layer in the terminal and a terminating/target layer of the transmission.

2. The method of claim 1, wherein the throughput and/or latency parameter(s) is measured from an originating IP address of data bits to a terminating IP address of said data bits.

3. The method of claim 1, wherein the measuring comprises the terminal sending a ping to a pre-determined node via each of the RATs.

4. The method of claim 1, further comprising:
using the established RAT for connecting to a node via said established RAT.

5. The method of claim 1, wherein the performance mode is determined if the terminal is connected to a power supply.

6. The method of claim 1, wherein the determining is dependent on noting a user profile of the terminal, the user profile having been chosen by a user of the terminal.

7. The method of claim 1, wherein the determining is dependent on observing at least one predetermined metric, the metric(s) being a geographical position of the terminal, a time of day and/or of week, and/or a battery charge level of the terminal.

8. The method of claim 1, further comprising:
ascertaining a minimum requirement of at least one predetermined parameter of a RAT for allowing said RAT to be selected, based on the configuration of the terminal.

9. The method of claim 1, wherein the plurality of different predetermined RAT selection modes also comprises:
a radio reception mode, in which the selected RAT is selected based on which of the available RATs presents a higher measured downlink reception; and/or
a power saving mode, in which the selected RAT is selected based on which of the available RATs implies a lower power consumption in the terminal.

10. A wireless communication terminal comprising:
means for scanning at least one frequency band to identify available Radio Access Technologies (RATs) which the terminal can use in view of a configuration of the terminal;

means for measuring at least one predetermined parameter of each of at least two of the available RATs, said parameter being related to the end-to-end performance available to the terminal via each of the RATs;

means for establishing which one of the available RATs provides a best performance, based on the measurements of the predetermined parameter;

means for providing a plurality of different predetermined RAT selection modes, said plurality of RAT selection modes comprising a performance mode;

means for determining which one of the plurality of different predetermined RAT selection modes the terminal currently is in; and means for selecting which one of the available RATs to use, based on the determined RAT selection mode, wherein the established RAT is selected if the terminal has been determined to be in the performance mode wherein the predetermined parameter gives an indication of available overall throughput of data bits from/to the terminal via each of the at least two RATs and/or an indication of latency of data bits from/to the terminal via each of the at least two RATs, and wherein the throughput and/or latency parameter(s) is measured between an origin of a transmission in a layer in the terminal and a terminating/target layer of the transmission.

11. A non-transitory processor-readable storage medium comprising instructions that, when executed by a processing unit included in a wireless communication terminal, cause the wireless communication terminal to perform a method for selecting a Radio Access Technology (RAT) to use, the method comprising:

scanning at least one frequency band to identify available RATs which the terminal can use in view of a configuration of the terminal;

measuring at least one predetermined parameter of each of at least two of the available RATs, said parameter being related to the end-to-end performance available to the terminal via each of the at least two RATs;

establishing which one of the available RATs provides the best performance, based on the measurements of the predetermined parameter;

providing a plurality of different predetermined RAT selection modes, said plurality of RAT selection modes comprising a performance mode;

determining which one of the plurality of different predetermined RAT selection modes the terminal currently is in; and selecting which one of the available RATs to use, based on the determined RAT selection mode, wherein the established RAT is selected if the terminal has been determined to be in the performance mode, wherein the measuring of the predetermined parameter gives an indication of available overall throughput of data bits from/to the terminal via each of the at least two RATs and/or an indication of latency of data bits from/to the terminal via each of the at least two RATs, and wherein the throughput and/or latency parameter(s) is measured between an origin of a transmission in a layer in the terminal and a terminating/target layer of the transmission.

\* \* \* \* \*